US012512806B2

(12) United States Patent
Yang et al.

(10) Patent No.: US 12,512,806 B2
(45) Date of Patent: Dec. 30, 2025

(54) FILTER INDUCTOR AND ON-BOARD-CHARGER

(71) Applicant: Delta Electronics (Shanghai) Co., Ltd., Shanghai (CN)

(72) Inventors: Haijun Yang, Shanghai (CN); Shiwei Liu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 693 days.

(21) Appl. No.: 17/213,252

(22) Filed: Mar. 26, 2021

(65) Prior Publication Data

US 2021/0376809 A1 Dec. 2, 2021

(30) Foreign Application Priority Data

May 26, 2020 (CN) .......................... 202010455295.7

(51) Int. Cl.
*H01F 27/24* (2006.01)
*H01F 27/28* (2006.01)
(Continued)

(52) U.S. Cl.
CPC ........... *H03H 7/0138* (2013.01); *H01F 27/24* (2013.01); *H01F 27/28* (2013.01); *H01F 27/38* (2013.01); *H02J 7/007* (2013.01); *H01F 17/062* (2013.01)

(58) Field of Classification Search
CPC ....... H03H 7/0138; H01F 27/24; H01F 27/28; H01F 27/38; H01F 17/062; H01F 3/10;
(Continued)

(56) References Cited

U.S. PATENT DOCUMENTS 6,456,182 B1 9/2002 Katayama et al.
8,379,417 B2 * 2/2013 Xiao .................... H02J 3/36
363/37
(Continued)

FOREIGN PATENT DOCUMENTS

CN 201622910 U 11/2010
CN 102377225 A 3/2012
(Continued)

OTHER PUBLICATIONS

Corresponding China Notice of Allowance issued on Feb. 9, 2022.
Corresponding China office action issued on Jun. 9, 2021.

*Primary Examiner* — Tuyen T Nguyen
(74) *Attorney, Agent, or Firm* — CKC & Partners Co., LLC

(57) ABSTRACT

A filter inductor, which includes: an outer magnetic core with a window, an inner magnetic core, and a winding. The inner magnetic core includes a first inner magnetic core and a second inner magnetic core which are located at least partially in the window. The winding includes a first winding, a second winding, a third winding and a fourth winding which are wound around the outer magnetic core at intervals. The first inner magnetic core and the second inner magnetic core are stacked. For the first inner magnetic core, a first end is located between the first winding and the second winding, and a second end is located between the third winding and the fourth winding. For the second inner magnetic core, a first end is located between the second winding and the third winding, and a second end is located between the fourth winding and the first winding.

14 Claims, 9 Drawing Sheets

(51) Int. Cl.
*H01F 27/38* (2006.01)
*H02J 7/00* (2006.01)
*H03H 7/01* (2006.01)
*H01F 17/06* (2006.01)

(58) Field of Classification Search
CPC ............... H01F 27/263; H01F 27/306; H01F 2017/065; H02J 7/007; H02J 7/02; H02J 2207/20; H02J 2310/48; H02M 1/123; H02M 1/126; H02M 1/44
USPC ............................... 336/178, 225, 229
See application file for complete search history.

(56) References Cited

U.S. PATENT DOCUMENTS

| | | | | |
|---|---|---|---|---|
| 9,741,483 | B2 * | 8/2017 | Joo | ............ H03H 1/0007 |
| 11,676,756 | B2 * | 6/2023 | Ji | ............ H01F 27/306 |
| | | | | 336/221 |
| 2008/0074227 | A1 | 3/2008 | Chen et al. | |
| 2009/0051478 | A1 * | 2/2009 | Lee | ............ H01F 3/10 |
| | | | | 336/212 |

FOREIGN PATENT DOCUMENTS

| | | | | |
|---|---|---|---|---|
| CN | 203786082 U | 8/2014 | | |
| CN | 204204550 U | 3/2015 | | |
| CN | 204424030 U | 6/2015 | | |
| CN | 204834277 U | 12/2015 | | |
| CN | 106158250 A | 11/2016 | | |
| CN | 205828090 U | 12/2016 | | |
| CN | 207345714 U | 5/2018 | | |
| CN | 208922882 U | 5/2019 | | |
| DE | 3047603 A1 | 7/1982 | | |
| DE | 19843465 B4 | 6/2005 | | |
| DE | 10311071 B4 * | 4/2009 | ............ | H01F 21/08 |
| DE | 102017214857 A1 * | 2/2019 | ............ | H01F 17/062 |
| JP | 2007300700 A | 11/2007 | | |
| TW | 200828360 A | 7/2008 | | |
| WO | 2018190075 A1 | 10/2018 | | |

* cited by examiner

FILTER INDUCTOR AND ON-BOARD-CHARGER

CROSS-REFERENCE TO RELATED APPLICATION

This application claims priority to Chinese Patent Application No. 202010455295.7, filed on May 26, 2020, which is hereby incorporated by reference in its entirety.

TECHNICAL FIELD

The present application relates to the field of power electronics technologies and, in particular to a filter inductor and an on-board-charger.

BACKGROUND

With the development of power electronics technologies, especially the development of new energy electric vehicle technologies, on-board-chargers are constantly developing toward higher power and shorter charging time. Common on-board-chargers usually include an Electromagnetic Interference (EMI) filter circuit. Differential mode and common mode filter inductors in an EMI filter circuit can use an integrated differential mode and common mode magnetic core structure to provide both differential mode and common mode impedance at the same time and reduce size and weight of the filter inductor. However, in a high-power three-phase on-board-charger, when currents of the three-phase windings are unbalanced, the existing filter inductors will have a large or even serious bias on a differential mode magnetic branch with a larger current. This makes the differential mode magnetic branch easily saturable due to large magnetic flux, which seriously affects the differential mode inductance and differential mode impedance, and results in that the capacity of the integrated EMI filter inductor to suppress EMI signals is significantly degraded or even ineffective.

SUMMARY

The present application provides a filter inductor and an on-board-charger, which are intended to solve the problem that the capacity of filter inductors in the prior art to suppress EMI signals is degraded or even ineffective when the currents flowing into respective windings are unbalanced.

In a first aspect, the present application provides a filter inductor, including: an outer magnetic core, an inner magnetic core and a winding, the inner magnetic core includes a first inner magnetic core and a second inner magnetic core, and the winding includes a first winding, a second winding, a third winding and a fourth winding;

the outer magnetic core has a window, at least part of the first inner magnetic core and at least part of the second inner magnetic core are located in the window, and the first winding, the second winding, the third winding and the fourth winding are wound around the outer magnetic core at intervals;

where the first inner core and the second inner core are stacked, a first end of the first inner magnetic core is located between the first winding and the second winding, a second end of the first inner magnetic core is located between the third winding and the fourth winding, a first end of the second inner magnetic core is located between the second winding and the third winding, and a second end of the second inner magnetic core is located between the fourth winding and the first winding.

Optionally, the filter inductor is used as a three-phase four-wire EMI filter inductor, the first winding, the second winding and the third winding are used to connect to three live wires of a three-phase power supply in one-to-one correspondence, and the fourth winding is used to connect to a neutral wire of the three-phase power supply.

Optionally, the outer magnetic core provides a magnetic flux path for common mode magnetic flux generated by a common mode interference signal in the windings, and the first inner magnetic core and the second inner magnetic core provide magnetic flux paths for differential mode magnetic flux generated by differential mode interference signals in the windings.

Optionally, a sum of a first current flowing through the first winding, a second current flowing through the second winding, a third current flowing through the third winding, and a fourth current flowing through the fourth winding is less than 500 mA.

Optionally, the outer magnetic core is toroidal, the first inner magnetic core and the second inner magnetic core are both strip-shaped, and the first inner magnetic core and the second inner magnetic core are independent of each other.

Optionally, a number of turns of each of the first winding, the second winding, the third winding, and the fourth winding is the same, and the first winding, the second winding, the third winding and the fourth winding are sequentially arranged adjacent to each other.

Optionally, relative magnetic permeability of the outer magnetic core is greater than 1000.

Optionally, there are gaps between the outer magnetic core and the first end and the second end of each of the first inner magnetic core and second inner magnetic core, and width of the gaps is 0.05 mm to 20 mm.

Optionally, an engaging recess is provided on each of the first inner magnetic core and the second inner magnetic core, and the engaging recess of the first inner magnetic core is engaged with the engaging recess of the second inner magnetic core.

Optionally, each of the first inner magnetic core and the second inner magnetic core is a silicon steel sheet.

Optionally, the first inner magnetic core and the second inner magnetic core are arranged crosswise, and an angle between the first inner magnetic core and the second inner magnetic core is within 45° to 135°.

Optionally, cross-sectional areas of the first inner magnetic core and the second inner magnetic core are equal.

In a second aspect, a filter inductor of the present application includes: an outer magnetic core, inner magnetic cores and windings, a number of the inner magnetic cores is at least two, and a number of the windings is at least four;

the outer magnetic core has a window, at least part of each of the inner magnetic cores is located in the window, and the windings are wound around the outer magnetic core at intervals;

where the inner magnetic cores are stacked, ends of the inner magnetic cores are located between adjacent two windings in one-to-one correspondence.

Optionally, a sum of currents flowing through the windings is less than 500 mA.

In a third aspect, the present application provides an on-board-charger, configured to draw power from a power distribution device and charge a high-voltage battery, where the on-board-charger includes a first filter circuit, a power factor correction circuit, a DC-DC voltage conversion circuit and a second filter circuit that are connected in sequence, the first filter circuit being an EMI filter circuit, which includes a filter inductor according to the first aspect or the second aspect.

Optionally, the on-board-charger is configured to obtain power from the high-voltage battery, and feedback power to the power distribution device or an electric device.

The present application provides a filter inductor and an on-board-charger. In the filter inductor, a first inner magnetic core and a second inner magnetic core are stacked and arranged in a window of an outer magnetic core, and a first end of the first inner magnetic core is located between a first winding and a second winding, a second end of the first inner magnetic core is located between a third winding and a fourth winding, a first end of the second inner magnetic core is located between the second winding and the third winding, and a second end of the second inner magnetic core is located between the fourth winding and the first winding. Therefore, the first inner magnetic core provides a magnetic flux path for differential mode magnetic flux generated by a differential mode interference signal in the first winding and the fourth winding, and provides a magnetic flux path for differential mode magnetic flux generated by a differential mode interference signal in the second winding and the third winding; at the same time, the second inner core provides a magnetic flux path for differential mode magnetic flux generated by a differential mode interference signal in the first winding and the second winding, and provides a magnetic flux path for differential mode magnetic flux generated by a differential mode interference signal in the fourth winding and the third winding. The filter inductor of the present application can effectively alleviate the magnetic bias problem caused by current imbalance to improve the capacity of the filter inductor to suppress EMI signals.

DESCRIPTION OF EMBODIMENTS

To make the objectives, technical solutions, and advantages of the present application clearer, the following clearly and comprehensively describes the technical solutions of the present application with reference to the accompanying drawings of the present disclosure. Apparently, the described embodiments are merely part rather than all embodiments of the present application. All other embodiments obtained by persons of ordinary skill in the art based on embodiments of the present application without creative effort shall fall within the protection scope of the present application.

With the development of power electronics technologies, especially the development of new energy electric vehicle technologies, on-board-chargers are developing toward higher power and shorter charging time. An on-board-charger is connected to a power distribution device and draws power therefrom to charge an on-board high-voltage battery. In order to provide the timeliness of charging similar to a refueling time of gasoline vehicles, it is urgent to develop high-power on-board-chargers. Although high-power on-board-chargers are easy to realize charging in some commercial areas or office areas because there have three-phase power distribution devices, however, in residential areas and some other places, the high-power on-board-chargers are difficult to use because there are usually only single-phase power distribution. Moreover, three-phase four-wire on-board-chargers are gaining more and more attentions because they can realize both three-phase charging and single-phase charging.

Figure 1:
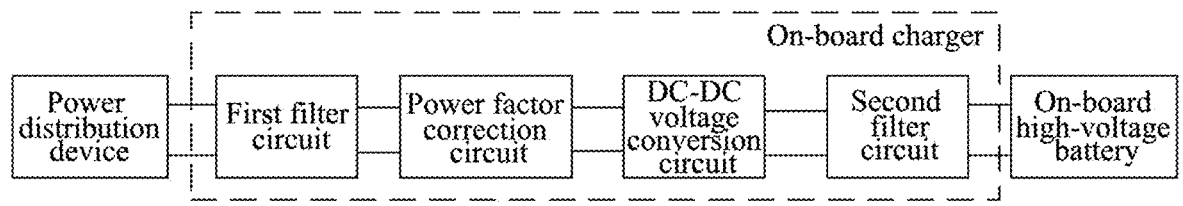
FIG. 1 is a schematic structural diagram of a main circuit of an on-board-charger provided by the present application.

As shown in FIG. 1, an on-board-charger includes a first filter circuit, a power factor correction circuit, a "direct current-direct current (DC-DC)" voltage conversion circuit, and a second filter circuit. Among them, the first filter circuit is usually an EMI filter circuit, which is used to eliminate an electromagnetic interference (Electro-magnetic Interference, EMI for short) signal generated when power electronics devices in the power factor correction circuit and/or the DC-DC voltage conversion circuit are switched.

Figure 2:
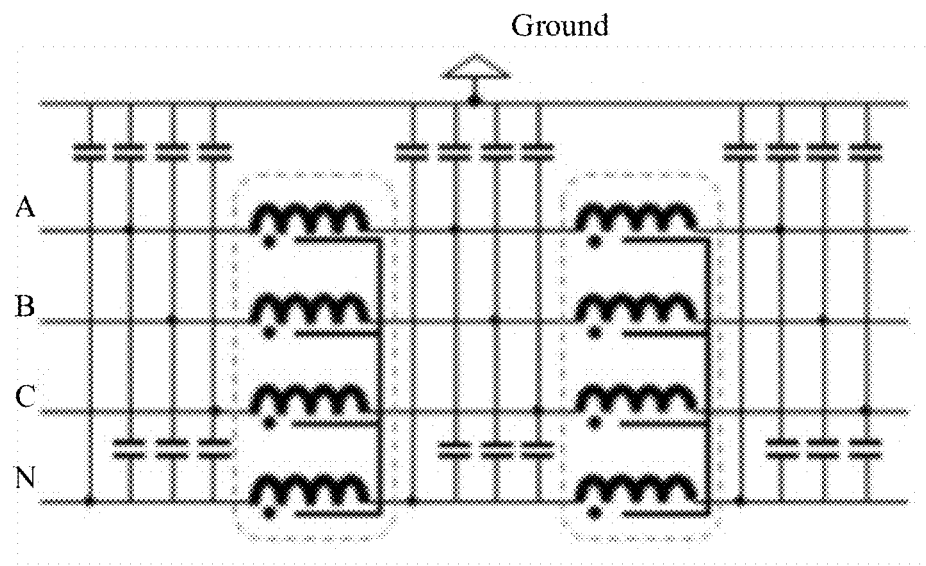
FIG. 2 is a schematic circuit structural diagram of a filter circuit provided by the present application.

The EMI filter circuit usually includes differential mode and common mode filter capacitors and differential mode and common mode filter inductors. The following takes a three-phase four-wire filter circuit as an example. As shown in FIG. 2, an EMI filter circuit may include two sets of differential mode and common mode filter inductors, and three sets of differential mode and common mode filter capacitors, and the inductors and the capacitors are interleaving connected. Wires A, B, and C represent three live wires, wire N represents a neutral wire, and the other wire is ground. The differential mode filter capacitors are connected between the neutral wire N and the three live wires A, B and C, respectively, and the common mode filter capacitors are connected between the neutral wire N, the three live wires A, B and C and the ground. Filter inductors are connected into the neutral wire N and the three live wires A, B, and C, respectively, and windings of the filter inductors are wound on a same magnetic core to form the common mode filter inductors. The differential mode filter inductors may be connected in series on each phase and/or N wire, or a differential mode flux path may be added on the basis of common mode filter inductors to integrate the differential mode and common mode filter inductors, and provide differential mode and common mode impedances at the same time, thereby reducing volume and weight of magnetic parts.

Figure 3:
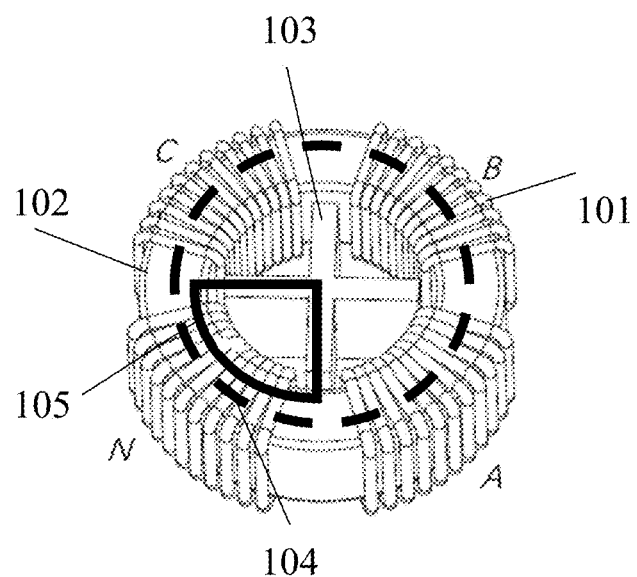
FIG. 3 is a schematic structural view of a filter inductor in the prior art.

In some applications, an integrated differential mode and common mode filter inductor includes an inner magnetic core 103, an outer magnetic core 102, and a winding 101 to provide both differential mode and common mode impedances at the same time. The inner magnetic core usually has a Y-shaped structure or a cross-shaped structure, where the Y-shaped structure is usually only used for a three-phase three-wire system, and the cross-shaped structure may be used for a three-phase four-wire system. As shown in FIG. 3, taking a cross-shaped inner magnetic core 103 and a toroidal outer magnetic core 102 as an example, an A-phase winding, a B-phase winding, a C-phase winding and a N-winding are wound on the toroidal outer magnetic core 102, a magnetic circuit 104 of common mode magnetic flux generated by a common mode interference signal is a loop enclosed by the toroidal outer magnetic core 102, and a magnetic circuit 105 of a differential mode magnetic field generated by a differential mode interference signal in each phase winding is a loop enclosed by two adjacent branches of the cross-shaped inner magnetic core 103 and a part of the outer toroidal magnetic core 102. In addition to the differential mode interference signal (referred to as $CM_A$), the differential mode here also includes a power current in the winding or a current in the multiple windings considered and a resultant differential mode component (referred to as $CM_B$), and saturation and other properties of the inner magnetic core are mainly affected by this part of the differential mode component $CM_B$, which will not be repeated.

Currents flowing in the A-phase winding, B-phase winding, and C-phase winding are respectively expressed by the following formulas:

$$A(t)=X\cdot\sin(2\pi ft)$$

$$B(t)=Y\cdot\sin(2\pi ft-2/3\pi)$$

$$C(t)=Z\cdot\sin(2\pi ft+2/3\pi)$$

where, A(t), B(t), C(t) respectively represent instantaneous currents of the three phases A, B, and C at time t, X, Y, and Z each represents amplitude of the currents in the three phases of A, B, and C, f is grid frequency, t is time, $\pi$ is a mathematical constant, and the grid frequency f is usually 50 Hz or 60 Hz.

In the cross-shaped inner magnetic core 103, maximum differential mode magnetic flux (here expressed by a magnetic field strength $H_x$, where the subscript X may be A, B, C or N) generated by differential mode currents in the A-phase winding, B-phase winding, C-phase winding, and N-winding is expressed by the following formulas:

$$H_A l=2nA(t)=2nX$$

$$H_B l=2nB(t)=2nY$$

$$H_C l=2nC(t)=2nZ$$

$$H_N l=2nN(t)=2n\Theta$$

where: $H_x$ (the subscript X may be A, B, C or N) represents a differential mode magnetic field strength of each magnetic branch, A(t), B(t), C(t), N(t) are the instantaneous currents at time t on the A, B, C phase, and neutral wire N, respectively, n represents a number of turns of the winding, and X, Y, Z, $\Theta$ represent amplitude of the current on each phase and neutral wire.

Figure 4:
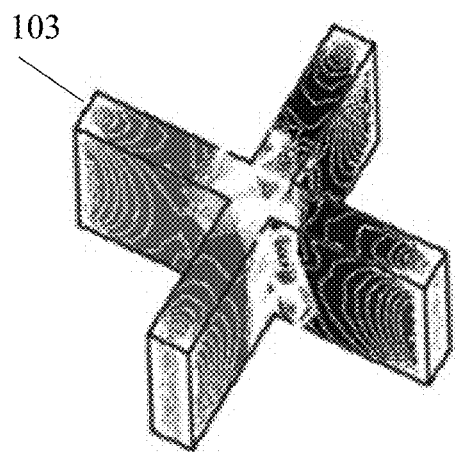
FIG. 4 is a schematic diagram of magnetic field distribution of an inner magnetic core in the prior art.

However, as shown in FIG. 4, when currents flowing through the windings are unbalanced, there will be large or even serious bias on a differential mode magnetic circuit induced by the larger current phase. Assuming that an A-phase current is used as a reference, a B-phase current is positively biased by a %, and a C-phase current is negatively biased by a % as an example, the maximum magnetic flux on the differential mode magnetic circuit of the B-phase current is 2nX (1+a %), so that the differential mode magnetic circuit is very easy to saturate due to the large magnetic flux by B-phase current. As shown in FIG. 4, the darker the color, the greater the magnetic flux and the stronger the magnetic field, that is, a magnetic field on the cross branches adjacent to both sides of the B-phase winding is very large, which seriously affects the differential mode inductance and differential mode impedance, and even affects the common mode impedance, and results in a significantly degraded capacity of the integrated differential mode and common mode EMI filter inductor to suppress EMI.

Embodiments of the present application provide a filter inductor and an on-board-charger, which are intended to solve the above technical problems. The inventive concept of the present application is to set two inner magnetic cores as independent components, and arrange ends of the inner magnetic cores between two adjacent windings, then make full use of the condition that the sum of all the winding currents approaches zero to set the positions of all the windings and the inner magnetic cores to make currents of the windings on one side of each of the inner magnetic cores be approximately the same as currents of the windings on the other side, so that the magnetic flux generated by the windings on the both sides of the inner magnetic cores are similar, and a magnitude variation of a vector sum of the currents in the multiple windings is much smaller than a magnitude variation of the current of a single winding, which can be used for a winding current imbalance situation, and has a good application effect of correction.

Figure 5:
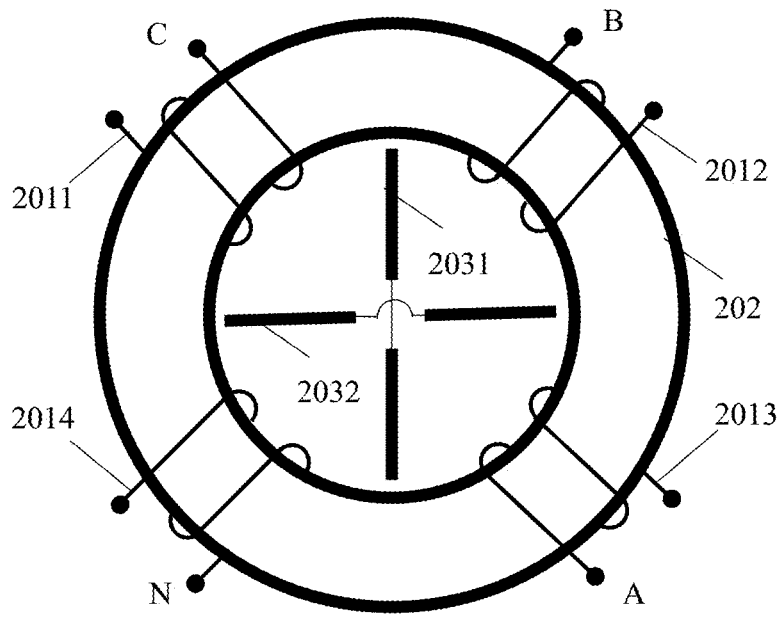
FIG. 5 is a schematic plane structural view of a filter inductor provided by a first embodiment of the present application.
Figure 6:
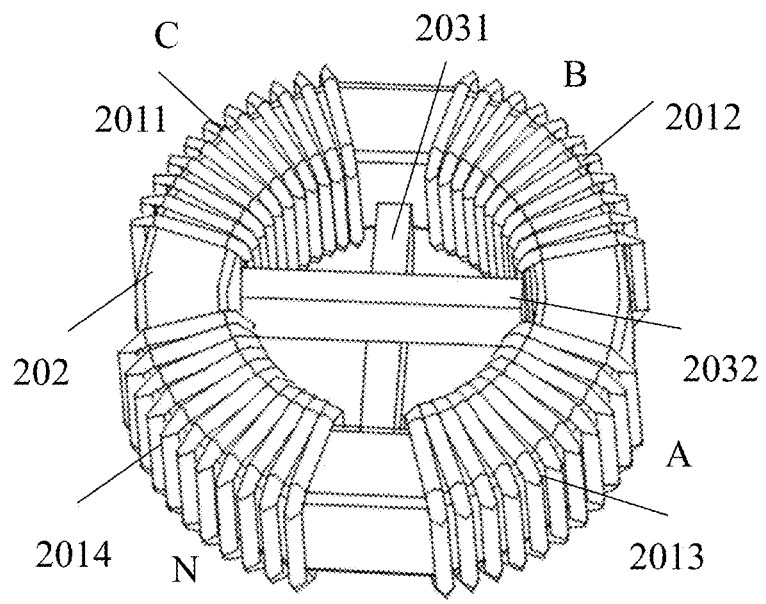
FIG. 6 is a schematic perspective structural view of a filter inductor provided by the first embodiment of the present application.

FIG. 5 is a schematic plane structural view of a filter inductor provided by a first embodiment of the present application, and FIG. 6 is a schematic perspective structural view of the filter inductor provided by the first embodiment of the present application. As shown in FIG. 5 and FIG. 6, the filter inductor provided by the present application includes a winding 201 (not shown), an outer magnetic core 202 and an inner magnetic core 203 (not shown). Among them, the inner magnetic core 203 includes a first inner magnetic core 2031 and a second inner magnetic core 2032, and the winding 201 includes a first winding 2011, a second winding 2012, a third winding 2013 and a fourth winding 2014.

Figure 7:
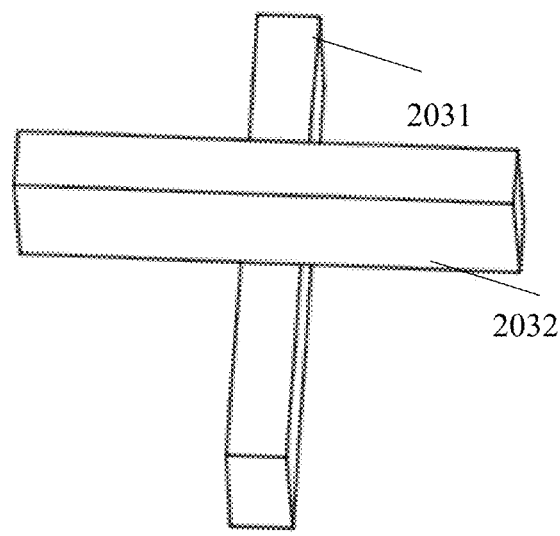
FIG. 7 is a schematic structural view of an inner magnetic core in the filter inductor shown in FIG. 6.
Figure 8:
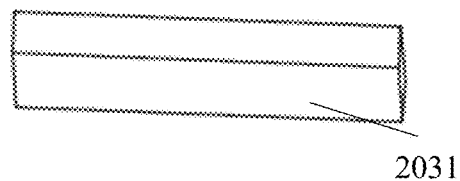
FIG. 8 is a schematic exploded structural view of the inner magnetic core shown in FIG. 7.
Figure 8:
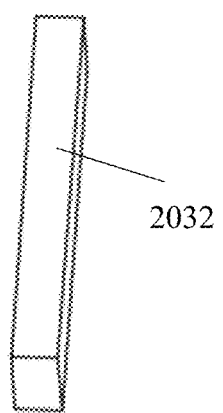

Among them, the outer magnetic core 202 is toroidal, and the outer magnetic core 202 may also be square-shaped or in other shapes. The outer magnetic core 202 has a window in which at least part of the first inner magnetic core 2031 and at least part of the second inner magnetic core 2032 are located. The first inner magnetic core 2031 and the second inner magnetic core 2032 may be completely located in the window, or only part of the first inner magnetic core 2031 and part of the second inner magnetic core 2032 may be located in the window. As shown in FIG. 7 and FIG. 8, the first inner magnetic core 2031 and the second inner magnetic core 2032 are stacked and arranged in a cross shape. The first inner magnetic core 2031 and the second inner magnetic core 2032 are both strip-shaped, and the first inner magnetic core 2031 and the second inner magnetic core 2032 are independent of each other. That is, the first inner magnetic core 2031 and the second inner magnetic core 2032 are not integrated into one piece, which is convenient for processing in manufacturing, and further, the separated inner magnetic cores 203 have much better performance in resisting unbalanced currents than the integrated inner magnetic core 103.

The first winding 2011, the second winding 2012, the third winding 2013 and the fourth winding 2014 are wound on the outer magnetic core 202 at intervals. The first winding 2011, the second winding 2012, the third winding 2013 and the fourth winding 2014 are sequentially arranged adjacent to each other. A first end of the first inner magnetic core 2031 is located between the first winding 2011 and a second winding 2012, a second end of the first inner magnetic core 2031 is located between the third winding 2013 and the fourth winding 2014, a first end of the second inner magnetic core 2032 is located between the second winding 2012 and the third winding 2013, and a second end of the second inner magnetic core 2032 is located between the fourth winding 2014 and the first winding 2011. The four windings are all wound on the outer magnetic core 202 through the window of the outer magnetic core 202.

In some embodiments, the filter inductor is used as a three-phase four-wire EMI filter inductor, the first winding 2011, the second winding 2012, and the third winding 2013 are used to connect to three live wires of a three-phase power supply in one-to-one correspondence, and a fourth winding 2014 is used to connect to a neutral wire of the three-phase power supply. The outer magnetic core 202 provides a magnetic flux path for common mode magnetic flux generated by a common mode interference signal in the windings, and the first inner magnetic core 2031 and the second inner magnetic core 2032 provide a magnetic flux path for differential mode magnetic flux generated by a differential mode interference signal in the windings. It should be noted that when the filter inductor is used as a three-phase four-wire EMI filter inductor, a sum of a first current flowing through the first winding 2011, a second current flowing through the second winding 2012, a third current flowing through the third winding 2013 and a fourth current flowing through the fourth winding 2014 approaches zero, for example, less than 500 mA.

In some embodiments, the outer magnetic core 202 is a high magnetic permeability magnetics, relative magnetic permeability of which is greater than 1000, and which may be ferrite or amorphous. The first inner magnetic core 2031 and the second inner magnetic core 2032 may be ferrite, alloy powder material, silicon steel, or the like. There are gaps between the outer magnetic core 202 and the first end and the second end of each of the first inner magnetic core 2031 and second inner magnetic core 2032, and width of the gaps is 0.05 mm to 20 mm.

In some embodiments, the first inner magnetic core 2031 and the second inner magnetic core 2302 are arranged crosswise, and an angle between the first inner magnetic core 2031 and the second inner magnetic core 2032 is within 45° to 135°. The above-mentioned angle setting can make windings with the same number of turns but different wire diameters wound on the outer magnetic core to meet power requirements on different phases or adapt to a requirement of unbalanced currents. The number of turns of the first winding 2011, the second winding 2012, the third winding 2013 and the fourth winding 2014 are the same, and the magnetic flux generated by the windings on both sides of each of the inner magnetic cores are approximately the same, which effectively resists a phenomenon of biasing and improves the capacity of the filter inductor to suppress EMI.

Figure 9:
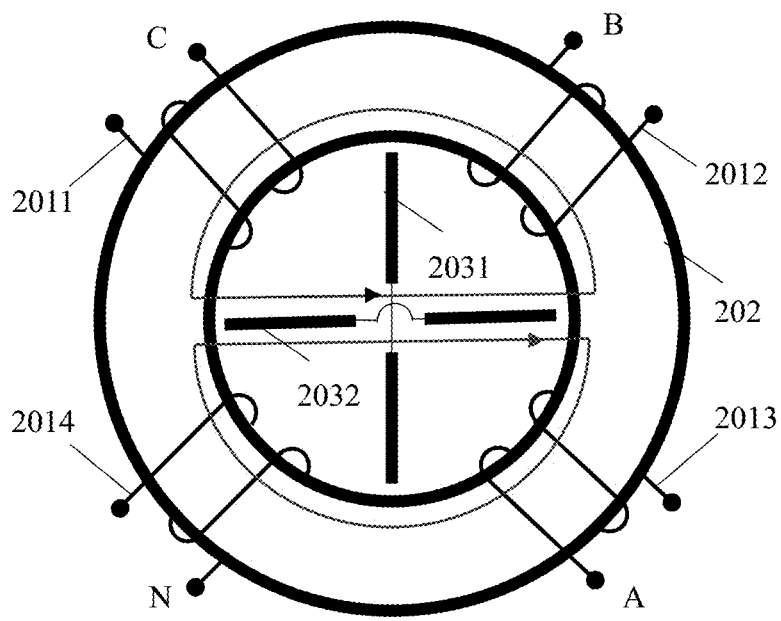
FIG. 9 is a schematic diagram of a magnetic circuit of a differential mode magnetic field provided by the first embodiment of the present application.

The following focuses on the description of working principles of the filter inductor when the first winding 2011, the second winding 2012, and the third winding 2013 connect to three live wires of a three-phase power supply in one-to-one correspondence, and the fourth winding 2014 connects to the neutral wire of the three-phase power supply. As shown in FIG. 9, the outer magnetic core 202 provides a magnetic flux path for common mode magnetic flux generated by a common mode interference signal in the first winding 2011, the second winding 2012, the third winding 2013 and the fourth winding 2014, so that the common mode impedance can effectively suppress the common mode interference signal. The first inner magnetic core 2031 provides a magnetic flux path for differential mode magnetic flux generated by a differential mode interference signal in the second winding 2012 and the third winding 2013, and also provides a magnetic flux path for differential mode magnetic flux generated by a differential mode interference signal in the first winding 2011 and the fourth winding 2014, so that the differential mode impedance effectively suppresses the differential mode interference signals. The second inner magnetic core 2032 provides a magnetic flux path for differential mode magnetic flux generated by a differential mode interference signal in the first winding 2011 and the second winding 2012, and provides a magnetic flux path for differential mode magnetic flux generated by a differential mode interference signal in the third winding 2013 and the fourth winding 2014, so that the differential mode impedance effectively suppresses the differential mode interference signals.

The following focuses on the description of magnetic flux distributions of inner magnetic cores when the filter inductor works in a three-phase current balanced working condition and a three-phase current unbalanced working condition.

It is assumed that a first winding 2011, a second winding 2012, and a third winding 2013 are electrified with phase A, phase B, and phase C, respectively. Then currents in the first winding 2011, the second winding 2012 and the third winding 2013 are:

$$A(t)=X \cdot \sin(2\pi f t)$$

$$B(t)=Y \cdot \sin(2\pi f t - 2/3\pi)$$

$$C(t)=Z \cdot \sin(2\pi f t + 2/3\pi)$$

the meaning of the symbols in the formula is as mentioned above, which will not be repeated here.

Then the current in the fourth winding 2014 is:

$$N(t)=-A(t)-B(t)-C(t)$$

Figure 10:
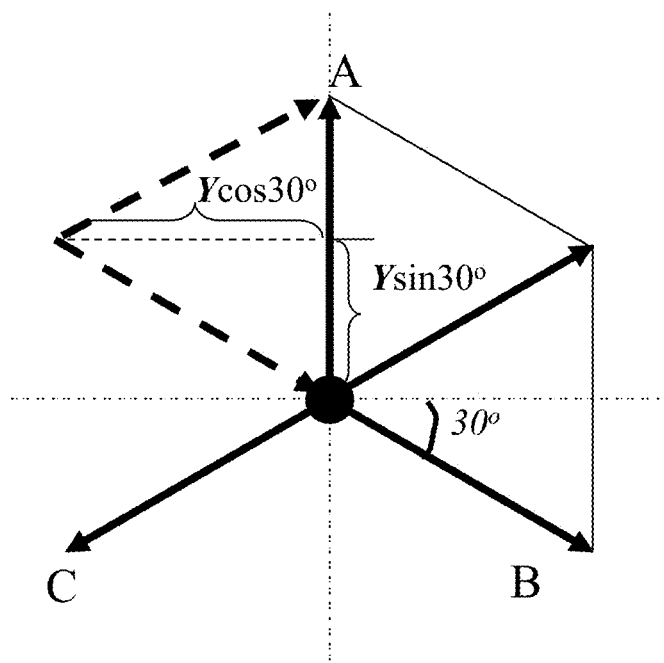
FIG. 10 is a schematic diagram of three-phase current phasor sum provided in the first embodiment of this application.

As shown in FIG. 9 and FIG. 10, in the first inner magnetic core 2031, the currents in the second winding 2012 and the third winding 2013 and the resultant differential mode magnetic flux, and the currents in the fourth winding 2014 and the first winding 2011 and the resultant differential mode magnetic flux (expressed by the magnetic field strength $H_{BC}$) are expressed by the following formula:

$$H_{BC}l = 2n\sqrt{\left(Y - \frac{1}{2}Z\right)^2 + \left(\frac{\sqrt{3}}{2}Z\right)^2}$$

l represents length of a differential mode magnetic circuit, which is approximately equal to a gap value between any inner magnetic core and the outer magnetic core and/or length of any inner magnetic core.

In the second inner magnetic core 2032, the currents in the first winding 2011 and the second winding 2012 and the resultant differential mode magnetic flux, and the currents in the third winding 2013 and the fourth winding 2014 and the resultant differential mode magnetic flux (expressed by $H_{AB}$) are expressed by the following formula:

$$H_{AB}l = 2n\sqrt{\left(X - \frac{1}{2}Y\right)^2 + \left(\frac{\sqrt{3}}{2}Y\right)^2}$$

When the three-phase currents are balanced, X=Y=Z, N(t)=0. $H_{BC}l=H_{AB}l=l=2nX$.

When the three-phase currents are unbalanced, and based on the A-phase current, the B-phase is positively biased by a %, and the C-phase is negatively biased by a %.

$$H_{BC}l = 2n\sqrt{\left(Y - \frac{1}{2}Z\right)^2 + \left(\frac{\sqrt{3}}{2}Z\right)^2} =$$
$$2n\sqrt{Y^2 + Z^2 - YZ} = 2nX\sqrt{3a^2 + 1}$$

$$H_{AB}l = 2n\sqrt{\left(X - \frac{1}{2}Y\right)^2 + \left(\frac{\sqrt{3}}{2}Y\right)^2} =$$
$$2n\sqrt{X^2 + Y^2 - XY} = 2nX\sqrt{1 - (1 + a\%) + (1 + a\%)^2}$$

It can be seen from the above formulas that when the imbalance occurs in a certain phase current, the differential mode magnetic flux generated by this phase current does not increase linearly as the differential mode magnetic flux in the filter inductor as shown in FIG. 3 and FIG. 4, that is, in the case of the same current bias, the differential mode magnetic flux of the filter inductor in this embodiment is much smaller than the differential mode magnetic flux in the filter inductor shown in FIG. 3 and FIG. 4, and the filter inductor of this embodiment can effectively alleviate the bias phenomenon when the currents are unbalanced. That is, due to the winding arrangement on both sides of each inner magnetic core 203, the amplitude variation of the vector sum of the currents is much smaller than the amplitude variation of the current of each phase in the unbalanced currents, and thus the bias phenomenon can be significantly alleviated when the currents of the phases are unbalanced.

In the filter inductor provided by the embodiment of the present application, the first winding 2011 and the fourth winding 2014 are located on one side of the first inner magnetic core 2031, and the second winding 2012 and the third winding 2013 are located on the other side of the first inner magnetic core 2031. And since the total current flowing through the first winding 2011 and the fourth winding 2014 approaches the same as the total current flowing through the second winding 2012 and the third winding 2013, the magnetic flux generated by the first winding 2011 and the fourth winding 2014 in the first inner magnetic core 2031 is close to the magnetic flux generated by the second winding 2012 and the third winding 2013 in the first magnetic core 2031. That is, the source of effective magnetic flux in the first magnetic core 2031 is the superposition of the vector sum of the currents in the first winding 2011 and the fourth winding 2014 and the vector sum of the currents in the second winding 2012 and the third winding 2013. When the currents in the windings are unbalanced, the amplitude variation of the sum of the two sets of currents on both sides of the first inner magnetic core is much smaller than the amplitude variation of the current of each phase in the unbalanced currents, that is, no large bias is generated in the first inner magnetic core 2031.

Similarly, the first winding 2011 and the second winding 2012 are located on one side of the second inner magnetic core 2032, and the third winding 2013 and the fourth winding 2014 are located on the other side of the second inner magnetic core 2032. Since the total current flowing through the first winding 2011 and the second winding 2012 approaches the same as the total current flowing through the third winding 2013 and the fourth winding 2014, the magnetic flux generated by the first winding 2011 and the second winding 2012 in the second inner magnetic core 2032 is close to the magnetic flux generated by the third winding 2013 and the fourth winding 2014 in the second inner magnetic core 2032. When the currents in the windings are unbalanced, the amplitude variation of the sum of the two sets of currents on both sides of the second inner magnetic core is also much smaller than the amplitude variation of the current of each phase in the unbalanced currents, and no large bias is generated in the second inner magnetic core 2032. Because the EMI suppression capacity of the filter inductor is significantly improved, this integrated EMI filter inductor can work stably even if there is a large current imbalance in the three-phase winding currents.

Figure 11:
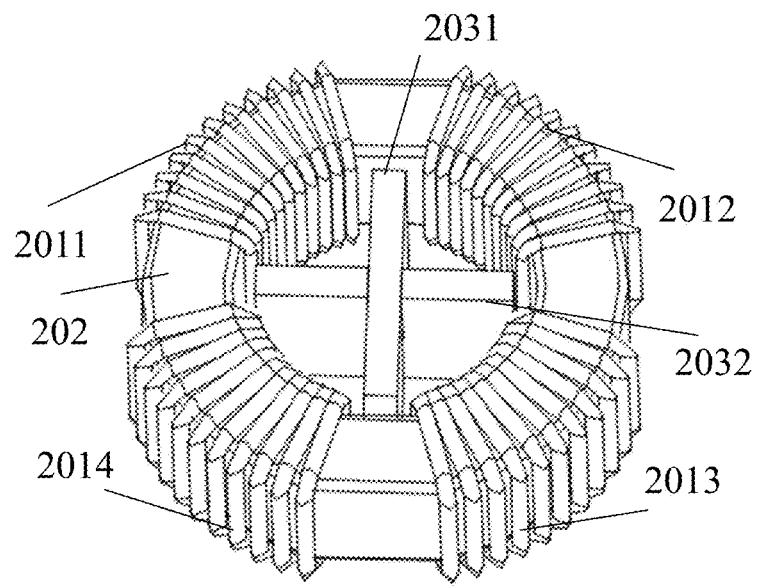
FIG. 11 is a schematic perspective structural view of a filter inductor provided by a second embodiment of the present application.

FIG. 11 is a schematic three-dimensional structural view of a filter inductor provided by a second embodiment of the present application. As shown in FIG. 11, the filter inductor provided by the present application includes a winding 201 (not shown), an outer magnetic core 202 and an inner magnetic core 203 (not shown). Among them, the inner magnetic core 203 includes a first inner magnetic core 2031 and a second inner magnetic core 2032, and the winding 201 includes a first winding 2011, a second winding 2012, a third winding 2013, and a fourth winding 2014. The characteristics of the outer magnetic core 202 and the winding 201 may be the same as or similar to the above embodiments.

Figure 12:
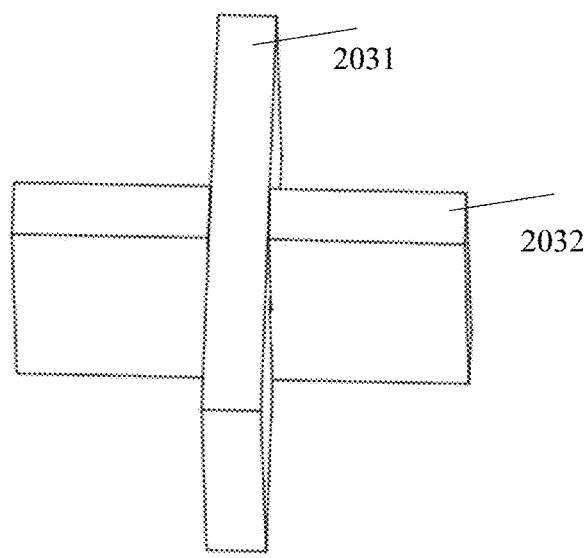
FIG. 12 is a schematic structural view of an inner magnetic core in the filter inductor shown in FIG. 11.
Figure 13:
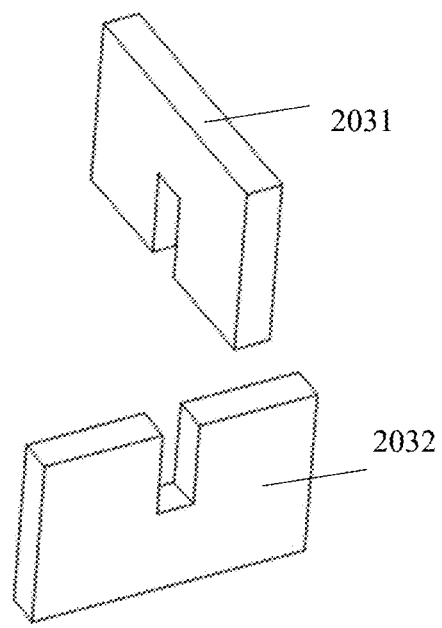
FIG. 13 is a schematic exploded structural view of the inner magnetic core shown in FIG. 12.

As shown in FIG. 12 and FIG. 13, the filter inductor provided in the second embodiment is different from the filter inductor provided in the first embodiment in that the first inner magnetic core 2031 and the second inner magnetic core 2032 are each provided with an engaging recess, the engaging recess of the first inner magnetic core 2031 is engaged with the engaging recess of the second inner magnetic core 2032. Specifically, the engaging recess may be provided in the middle of the first inner magnetic core 2031 and the second inner magnetic core 2032, but the position of the engaging recess of the present application is not limited thereto.

Figure 14:
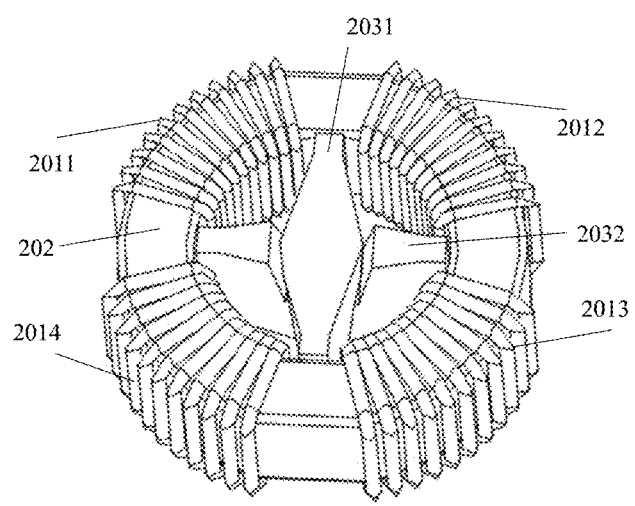
FIG. 14 is a schematic perspective structural view of yet another filter inductor provided by the second embodiment of the present application.
Figure 15:
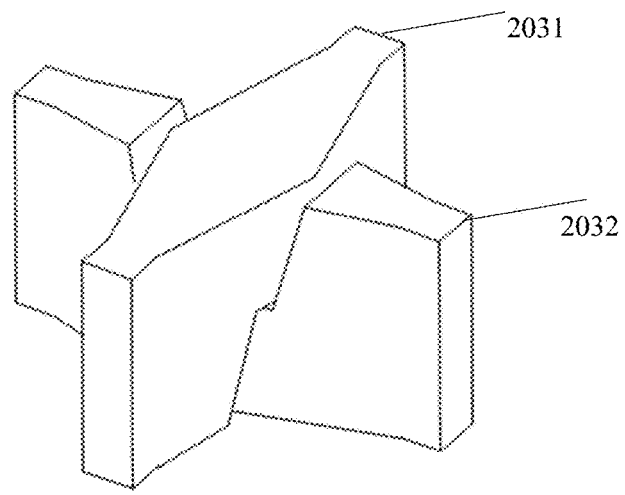
FIG. 15 is a schematic structural view of an inner magnetic core in the filter inductor shown in FIG. 14.
Figure 16:
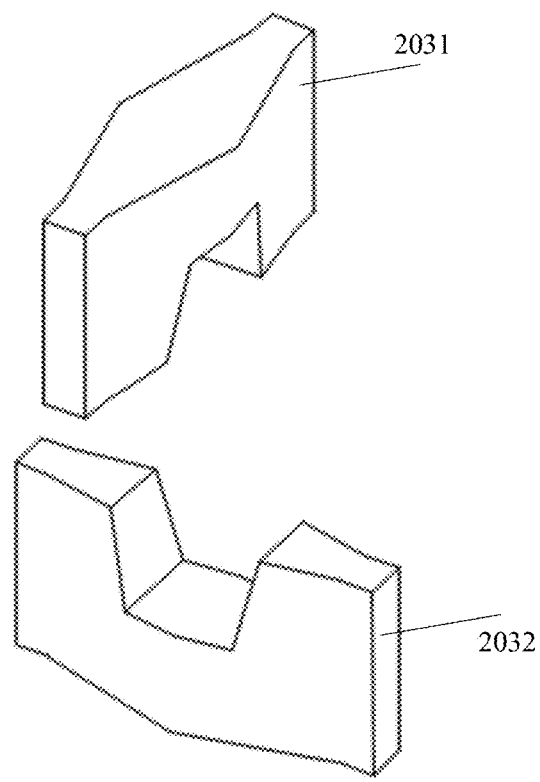
FIG. 16 is a schematic exploded structural view of the inner magnetic core shown in FIG. 15.

Since an engaging recess is provided in the middle of the first inner magnetic core 2031 and the second inner magnetic core 2032, a cross-sectional area at the engaging recess is smaller than cross-sectional areas at both ends, and the main purpose of the arrangement is to make cross-sectional areas of the ends of the inner magnetic cores directly opposite to the outer magnetic core larger, which can effectively reduce or avoid local saturation of the parts where the outer magnetic core faces the inner magnetic cores due to the effect of differential mode magnetic flux, and the corresponding inner magnetic core can be made of materials with high saturation magnetic flux characteristics, such as silicon steel. In order to effectively use the magnetic cores and make the saturation magnetic flux in each cross section the same, the first inner magnetic core 2031 and the second inner magnetic core 2032 may also be configured as magnetic cores of equal cross-sectional area. The cross-sectional areas of the first inner magnetic core 2031 and the second inner magnetic core 2032 are made to be equal. That is, as shown in FIG. 14, FIG. 15 and FIG. 16, the first inner magnetic core 2031 and the second inner magnetic core 2032 are spindle-shaped.

The first inner magnetic core 2031 and the second inner magnetic core 2032 may also be arranged in a long strip shape, and different materials may be used on different cross sections to make the inner magnetic core, so that the saturation magnetic flux on each cross section is the same. It is also possible to use a magnetic core material which is not easy to saturate.

The working principle, currents unbalanced working condition and currents balanced working condition of the filter inductor provided in this embodiment are the same as those in the first embodiment, which will not be repeated here. In the filter inductor provided by the embodiment of the present application, the two inner magnetic cores are stacked, which is also beneficial to the fixing of the inner magnetic cores and improves the working reliability and stability of the filter inductor.

The following focuses on the description of a filter inductor provided in a third embodiment of the present application. The filter inductor provided in the third embodiment of the present application includes an outer magnetic core 302, inner magnetic cores 303, and windings 301. Among them, the number of the inner magnetic cores 303 is at least two, and the number of the windings 301 is at least four. The outer magnetic core 302 has a window, at least part of each of the inner magnetic cores 303 are located in the window, the inner magnetic cores 303 may be completely located in the window, or part of each of the inner magnetic cores 303 may be located in the window. The inner magnetic cores 303 are stacked, the windings 301 are wound around the outer magnetic core 302 at intervals, and ends of the inner magnetic cores 303 are located between adjacent two windings 301 in one-to-one correspondence.

The structure of the filter inductor will be described in detail below with reference to FIG. 17 and FIG. 18, by taking three inner magnetic cores 303 and six windings 301 as an example. The three inner magnetic cores 303 are sequentially labeled as first inner magnetic core 3031, second inner magnetic core 3032, and third inner magnetic core 3033. The six windings 301 are sequentially labeled as first winding 3011, second winding 3012, third winding 3013, fourth winding 3014, fifth winding 3015, and sixth winding 3016. The first inner magnetic core 3031, the second inner magnetic core 3032, and the third inner magnetic core 3033 are stacked, and the first winding 3011 to the sixth winding 3016 are sequentially wound on the outer magnetic core 302 at intervals. A first end of the first inner magnetic core 3031 is located between the first winding 3011 and the second winding 3012, and a second end of the first inner magnetic core 3031 is located between the fourth winding 3014 and the fifth winding 3015. A first end of the second inner magnetic core 3032 is located between the second winding 3012 and the third winding 3013, and a second end of the second inner magnetic core 3032 is located between the fifth winding 3015 and the sixth winding 3016. A first end of the third inner magnetic core 3033 is located between the third winding 3013 and the fourth winding 3014, and a second end of the third inner magnetic core 3033 is located between the sixth winding 3016 and the first winding 3011.

Figure 17:
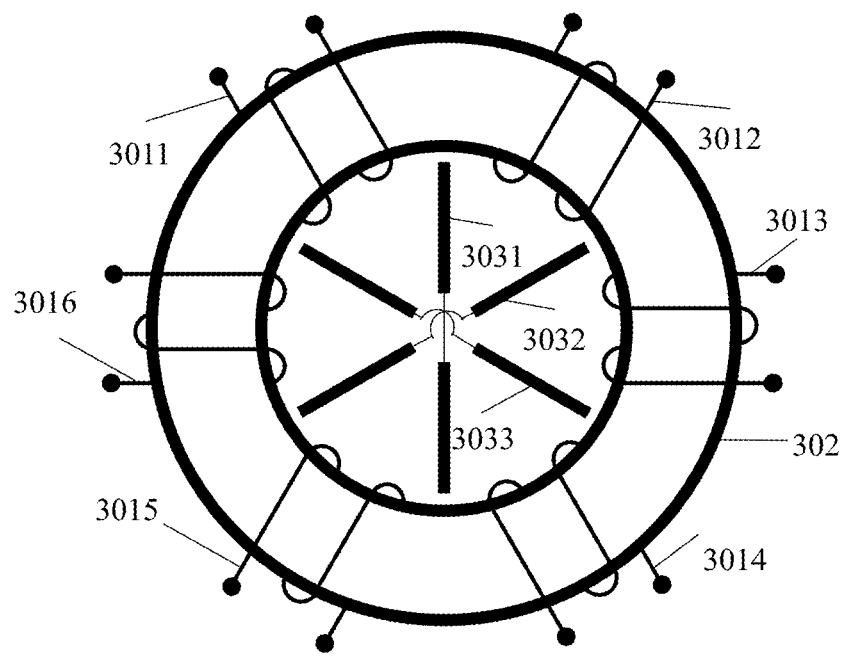
FIG. 17 is a schematic plane structural view of a filter inductor provided by a third embodiment of the present application.
Figure 18:
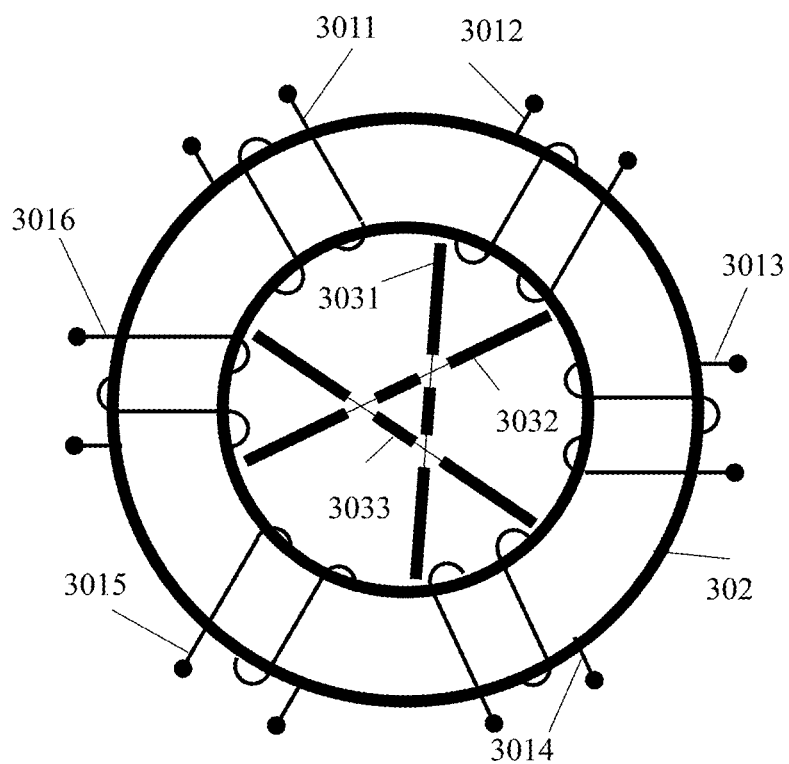
FIG. 18 is a schematic plane structural view of yet another filter inductor provided by the third embodiment of the present application.

As shown in FIG. 17, the first inner magnetic core 3031, the second inner magnetic core 3032 and the third inner magnetic core 3033 are stacked at a same position. As shown in FIG. 18, the first inner magnetic core 3031, the second inner magnetic core 3032 and the third inner magnetic core 3033 are stacked at multiple positions.

In some embodiments, a sum of the currents flowing through the windings approaches zero, for example, less than 500 mA. The total current in the second winding 3012, the third winding 3013 and the fourth winding 3014 is approximately equal to the total current in the first winding 3011, the fifth winding 3015 and the sixth winding 3016. The magnetic flux generated by the currents in the second winding 3012, the third winding 3013 and the fourth winding 3014 in the first inner magnetic core 3031 and the magnetic flux generated by the currents in the first winding 3011, the fifth winding 3015 and the sixth winding 3016 in the first inner magnetic core 3031 are similar in amount. The second inner magnetic core 3032 and the third inner magnetic core 3033 have a similar situation, that is, the magnetic flux generated by the currents in the windings on one side of each of the inner magnetic cores and the magnetic flux generated by the currents in the windings on the other side are approximately the same, which will not be repeated here. When the currents in the windings are unbalanced, no large bias is generated in the inner magnetic cores 303, which improves the capacity of the filter inductor to suppress EMI.

In some embodiments, the outer magnetic core 302 is a high magnetic permeability magnetics, relative magnetic permeability of which is greater than 1000, and which may be ferrite or amorphous. The inner magnetic core 303 may be an alloy powder core material with low relative magnetic permeability, or a high relative magnetic permeability ferrite, amorphous material or silicon steel, or the like. There are gaps between both ends of the inner magnetic cores 303 and the outer magnetic core 302, and width of the gaps is 0.05 mm to 20 mm. The number of turns of each of the windings 301 is the same. Other features may be the same as or similar to the corresponding features in the above embodiments.

The following focuses on the description of working principles of the filter inductor: the outer magnetic core 302 provides a magnetic flux path for common mode magnetic flux generated by a common mode interference signal in all windings 301 to suppress the common mode interference signal. Each inner magnetic core 303 provides a magnetic flux path for differential mode magnetic flux generated by a differential mode interference signal between the windings 301 on both sides thereof to suppress the differential mode interference signals.

A filter inductor provided by an embodiment of the present application can be extended to a case of more than two inner magnetic cores and more than four windings, so as to be suitable for filter inductors of different wire systems.

As shown in FIG. 1 and FIG. 2, an embodiment of the present application further provides an on-board-charger. The on-board-charger includes a first filter circuit, a power factor correction circuit, a DC-DC voltage conversion circuit, and a second filter circuit that are connected in sequence, where the first filter circuit is an EMI filter circuit, and the first filter circuit includes a filter inductor provided in the above embodiments. The on-board-charger may be configured to draw power from a power distribution device and charge an on-board high-voltage battery, and may also be configured to obtain power from a high-voltage battery and feedback power to a power distribution device or an electrical device.

For example, the power of an on-board-charger can flow in both directions. When the on-board-charger is charging an on-board high-voltage battery in a forward direction, the power passes from the power distribution device to the on-board high-voltage battery through the first filter circuit, the power factor correction circuit, the DC-DC voltage conversion circuit and the second filter circuit in sequence. When the on-board high-voltage battery feeds back power to a power distribution device or an electrical device, the power passes from the on-board high-voltage battery to the power distribution device through the second filter circuit, the DC-DC voltage conversion circuit, the power factor correction circuit and the first filter circuit in sequence. At this time, the power factor correction circuit reversely operates in an inverter working condition.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present application.

What is claimed is:

1. A filter inductor, comprising: an outer magnetic core, an inner magnetic core, and a winding, wherein the inner magnetic core comprises a first inner magnetic core and a second inner magnetic core, and the winding comprises a first winding, a second winding, a third winding and a fourth winding;

the outer magnetic core has a window, at least part of the first inner magnetic core and at least part of the second inner magnetic core are located in the window, and the first winding, the second winding, the third winding and the fourth winding are wound around the outer magnetic core at intervals;

wherein the first inner magnetic core and the second inner magnetic core are stacked and independent of each other, a first end of the first inner magnetic core is located between the first winding and the second winding, a second end of the first inner magnetic core is located between the third winding and the fourth winding, a first end of the second inner magnetic core is located between the second winding and the third winding, and a second end of the second inner magnetic core is located between the fourth winding and the first winding;

wherein the first inner magnetic core provides a magnetic flux path for differential mode magnetic flux generated by a differential mode interference signal in the first winding and the fourth winding, and provides a magnetic flux path for differential mode magnetic flux generated by a differential mode interference signal in the second winding and the third winding; and the second inner magnetic core provides a magnetic flux path for differential mode magnetic flux generated by a differential mode interference signal in the first winding and the second winding, and provides a magnetic flux path for differential mode magnetic flux generated by a differential mode interference signal in the third winding and the fourth winding;

wherein a sum of a first current flowing through the first winding, a second current flowing through the second winding, a third current flowing through the third winding and a fourth current flowing through the fourth winding is less than 500 mA;

wherein a combined thickness of the first inner magnetic core and the second inner magnetic core when stacked on top of each other is approximately the same as a thickness of the outer magnetic core.

2. The filter inductor according to claim 1, wherein the filter inductor is used as a three-phase four-wire Electromagnetic Interference (EMI) filter inductor, the first winding, the second winding and the third winding are used to connect to three live wires of a three-phase power supply in one-to-one correspondence, and the fourth winding is used to connect to a neutral wire of the three-phase power supply.

3. The filter inductor according to claim 1, wherein the outer magnetic core provides a magnetic flux path for common mode magnetic flux generated by a common mode interference signal in the winding.

4. The filter inductor according to claim 1, wherein the outer magnetic core is toroidal, the first inner magnetic core and the second inner magnetic core are both strip-shaped.

5. The filter inductor according to claim 1, wherein a number of turns of each of the first winding, the second winding, the third winding and the fourth winding is the same, and the first winding, the second winding, the third winding and the fourth winding are sequentially arranged adjacent to each other.

6. The filter inductor according to claim 1, wherein relative magnetic permeability of the outer magnetic core is greater than 1000.

7. The filter inductor according to claim 1, wherein there are gaps between the outer magnetic core and the first end and the second end of each of the first inner magnetic core and second inner magnetic core, and width of the gaps is 0.05 mm to 20 mm.

8. The filter inductor according to claim 1, wherein an engaging recess is provided on each of the first inner magnetic core and the second inner magnetic core, and the engaging recess of the first inner magnetic core is engaged with the engaging recess of the second inner magnetic core.

9. The filter inductor according to claim 1, wherein each of the first inner magnetic core and the second inner magnetic core is a silicon steel sheet.

10. The filter inductor according to claim 1, wherein the first inner magnetic core and the second inner magnetic core are arranged crosswise, and an angle between the first inner magnetic core and the second inner magnetic core is within 45° to 135°.

11. The filter inductor according to claim 1, wherein cross-sectional areas of the first inner magnetic core and the second inner magnetic core are equal.

12. A filter inductor, comprising: an outer magnetic core, inner magnetic cores, and windings, wherein a number of the inner magnetic cores is at least two, and a number of the windings is at least four;

the outer magnetic core has a window, at least part of each of the inner magnetic cores is located in the window, and the windings are wound around the outer magnetic core at intervals;

wherein the inner magnetic cores are stacked and independent of each other, and ends of the inner magnetic cores are located between adjacent two windings in one-to-one correspondence;

wherein each inner magnetic core provides a magnetic flux path for differential mode magnetic flux generated by a differential mode interference signal between windings on both sides of the inner magnetic core;

wherein a sum of currents flowing through the windings is less than 500 mA;

wherein a combined thickness of the inner magnetic cores when stacked on top of each other is approximately the same as a thickness of the outer magnetic core.

13. The filter inductor according to claim 1, wherein the outer magnetic core has a central axis extending through the window, the central axis being parallel to a thickness direction of the outer magnetic core, the first inner magnetic core and the second inner magnetic core are stacked along an axis direction of the central axis, and an entirety of the first inner magnetic core is positioned at a location different from an entirety of the second inner magnetic core in the axis direction of the central axis of the outer magnetic core.

14. The filter inductor according to claim 12, wherein the outer magnetic core has a central axis extending through the window, the central axis being parallel to a thickness direction of the outer magnetic core, the inner magnetic cores are stacked along an axis direction of the central axis, and an entirety of an inner magnetic core is positioned at a location different from an entirety of other inner magnetic cores in the axis direction of the central axis of the outer magnetic core.

* * * * *